United States Patent [19]
Shima et al.

[11] Patent Number: 5,319,787
[45] Date of Patent: Jun. 7, 1994

[54] PROCESSOR FOR CONTROL INCLUDING A DATA-FLOW PROCESSOR

[75] Inventors: Kenji Shima; Shoichi Washino, both of Amagasaki, Japan

[73] Assignee: Mitsubishi Denki Kabushiki Kaisha, Tokyo, Japan

[21] Appl. No.: 640,355

[22] PCT Filed: May 28, 1990

[86] PCT No.: PCT/JP90/00678

§ 371 Date: Feb. 21, 1991

§ 102(e) Date: Feb. 21, 1991

[87] PCT Pub. No.: WO90/14636

PCT Pub. Date: Nov. 29, 1990

[30] Foreign Application Priority Data

May 26, 1989 [JP] Japan ................... 1-13316

[51] Int. Cl.$^5$ .................. G06F 3/05; G06F 7/544; G06F 9/28; G06F 15/20

[52] U.S. Cl. .................. 395/800; 364/221.4; 364/228; 364/229.5; 364/230.4; 364/230.5; 364/230.6; 364/232.22; 364/232.21; 364/238.3; 364/240; 364/240.5; 364/240.8; 364/240.9; 364/242.1; 364/262.8; 364/264.7; 364/269; 364/275.2; 364/276.8; 364/281.7

[58] Field of Search ............. 395/800, 200, 400, 700, 395/375, 500, 425, 775, 725, 325, 250, 275; 364/231.8, DIG. 1, DIG. 2, 434, 459

[56] References Cited

U.S. PATENT DOCUMENTS

| 4,752,884 | 6/1988 | Slater et al. | 364/434 |
| 4,972,315 | 11/1990 | Yamasaki et al. | 395/400 |
| 5,021,947 | 6/1991 | Campbell et al. | 395/700 |
| 5,117,499 | 5/1992 | Miyata | 395/800 |
| 5,125,097 | 6/1992 | Okamoto et al. | 395/800 |

FOREIGN PATENT DOCUMENTS 9014636 11/1990 World Int. Prop. O. .

OTHER PUBLICATIONS

"A Data-Driven Processor" Kenji Shima et al., 1990, pp. 83-86.
"The Data-Driven Microprocessor" Shinji Komori et al., Jun. 1989, IEEE Micro, pp. 45-59.
Article by Shinji Komori and Kenji Shima, Jun. 1990, Mitsubishi Electric Advance, pp. 26-28.

*Primary Examiner*—Alyssa H. Bowler
*Assistant Examiner*—Daniel H. Pan
*Attorney, Agent, or Firm*—Sughrue, Mion, Zinn, Macpeak & Seas

[57] ABSTRACT

This invention relates to control processors utilized in various control fields such as engine control, motor control, robot control, audio control, image control, etc. The control processor includes a data-flow processor for improving control performance of conventional control processors by providing parallel processing.

7 Claims, 17 Drawing Sheets (e)

(a)

(b)

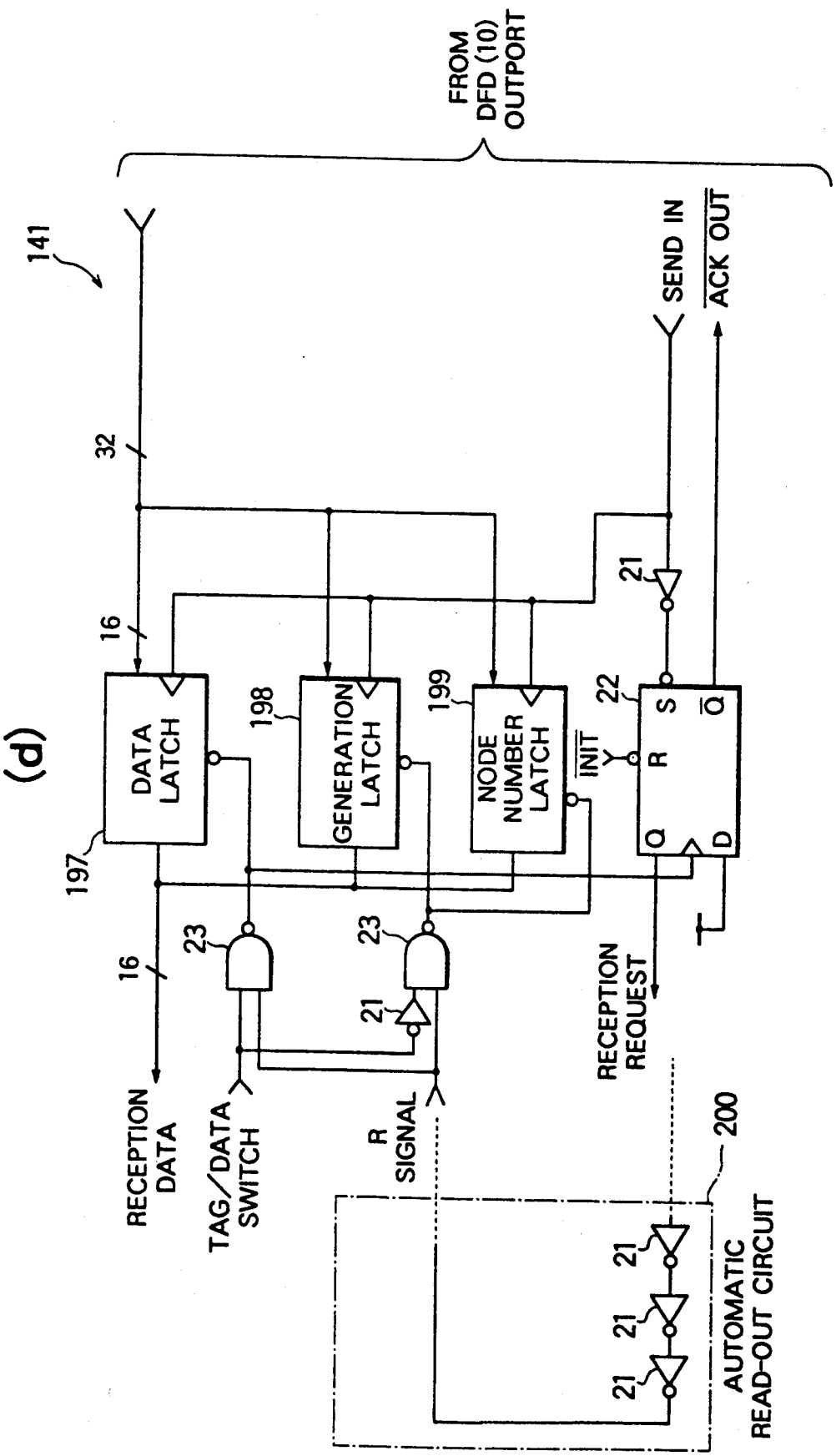

SEL : SELECTION CODE
COL/GEN : COLOR/GENERATION
OPC : OPERATION CODE
NODE # : NODE NUMBER
DATA : DATA

PROCESSOR FOR CONTROL INCLUDING A DATA-FLOW PROCESSOR

TECHNICAL FIELD

This invention relates to control processors which are utilized in various control fields such as engine control, or motor control, robot control, audio control, etc.

BACKGROUND ART

FIG. 1 is a view showing the organization of a control unit for an automotive engine which is currently available as commercial products and is put into practical service, while FIG. 2 is a view of the internal organization of the von Neumann type control processor utilized within the engine control unit of FIG. 1.

In these figures, the reference numeral 100 designates a von Neumann type control processor; reference numeral 101 designates a power transistor; reference numeral 102 designates an ignition coil; reference numeral 103 designates a distributor; reference numeral 104 designates a spark plug; reference numeral 105 designates an injector drive valve; reference numeral 110 designates an input/output portion of the processor 100; reference numeral 111 designates an analog/digital convertor (A/D convertor); reference numeral 112 designates a timer; reference numeral 113 designates a counter; reference numeral 114 designates a ROM; reference numeral 115 designates a RAM; reference numeral 116 designates an interrupt control unit; and reference numeral 117 designates a CPU.

The von Neumann type processor herein means a conventional processor which sequentially executes a stored program by means of a program counter.

Next, the method of operation is described.

Among the primary input signals inputted to the engine control unit 100 are: crank angle sensor signal which gives information with respective to the rpm of the engine and the ignition timings; air intake amount signal corresponding to the engine load; water temperature signal corresponding to the engine temperature; and the cell voltage which is the battery voltage. On the other hand, among the output signals are ignition control signal and injector drive signal.

This engine control unit 100 detects via the sensors the state of the engine, the rpm of the engine, the amount of air intake, and water temperature, calculates on the basis of these detected values the optimum ignition timings from the preset ignition timings, interrupts the primary current of the power transistor 101, and drives the ignition coil 102, thereby effecting the ignition timing control. Among the input signals, the idling detection signal is a digital-valued signal, by which only its state is shown, and which is read in via the I/O 110; the intake air amount signal, the water temperature signal, and the battery signal are inputted as analog values, and are converted into digital values by the A/D convertor 111.

With respect to the crank angle sensor signals, there are those which are inputted directly to the interrupt control unit 116 to generate an interrupt, and others which are demultiplied by the counter 113 measuring the predetermined number of the crank angle pulses and which are then inputted to the interrupt control unit 116 to generate an interrupt.

Next, the method by which the ignition timings are calculated utilizing these signals is described. First, the fundamental ignition timing (phase) $\theta_B$ is obtained from the air intake amount signal and the crank angle signal values. To this (obtained) value is added a water temperature correction (phase) $\theta_{WT}$ in accordance with the water temperature signal which is the engine warm state signal. A correction value which further advances from the time point 5 degrees before the top dead center (top dead center minus 5 degrees) is determined from these signals. The ignition timing (phase) $\theta_{AD\,V}$ is obtained by:

$$\theta_{AD\,V} = \theta_B + \theta_{WT}$$

The actual ignition timing is determined with the crank angle sensor signal as the reference. FIG. 3 shows a conceptual view of this correction process. These processes of operations are effected by the CPU 117 of FIG. 2; its program is stored in the ROM 114, the RAM being utilized for maintaining the intermediate results. The CPU 117 is a von Neumann type computer having an address counter which shows the address of the ROM 114 having an executable program therein.

Further, the calculation of the injector pulses for the air intake/fuel control is effected as follows. The pulse width Ti is given by:

$$Ti = \text{Fuel} \times K_{af} \times K_{wt} \times K_{VB}$$

and is calculated on the basis of the air intake amount signal, the water temperature signal, the battery voltage, the crank angle sensor signal, and the idling signal.

Further, the software organization of these calculations are as shown in FIG. 4. The judgment with respect to whether it is a fuel cut or not is effected by the idling detection sensor by means of the interrupt routine of FIG. 11(b).

Further, for the execution of this software, the whole of the crank angle sensor (SGT) signal period is utilized as shown in FIG. 5, such that the three cycles of fuel injection, ignition timing, and the asynchronous injection are repeated every 180 degrees of the crank angle.

Since the conventional control processors are organized as described above, due to the improvement of the performance of the engine and the appearance of high rpm multi-cylinder engines, a severe problem has arisen that the processor is fully occupied by the processing of the interrupts so as to have no time for the execution of the main routine, and that the processing other than the fuel injection and the ignition timing controls is beyond its capacity and totally unpracticable.

This invention has been done to solve the above problems, and aims at obtaining a control processor which improves the engine performance in accordance with the utilization of the higher rpm multi-cylinder engines, and which effects high precision controls utilizing a variety of information from a multitude of sensors, so as to control a high performance engine utilized in high performance passenger automobiles, etc., which are good in the riding comfort, enhanced in fuel economy, and excellent in starting and idling characteristics.

DISCLOSURE OF THE INVENTION

According to this invention, the control processor is organized by the utilization of a data-drive (data-flow) type processor. Thanks to this organization, a plurality of processes can be effected simultaneously in parallel, thereby shortening the processing termination time and greatly improving the control performance.

BEST MODES FOR CARRYING OUT THE INVENTION

In the following, a first embodiment of this invention is described by reference to the drawings.

Figure 1:
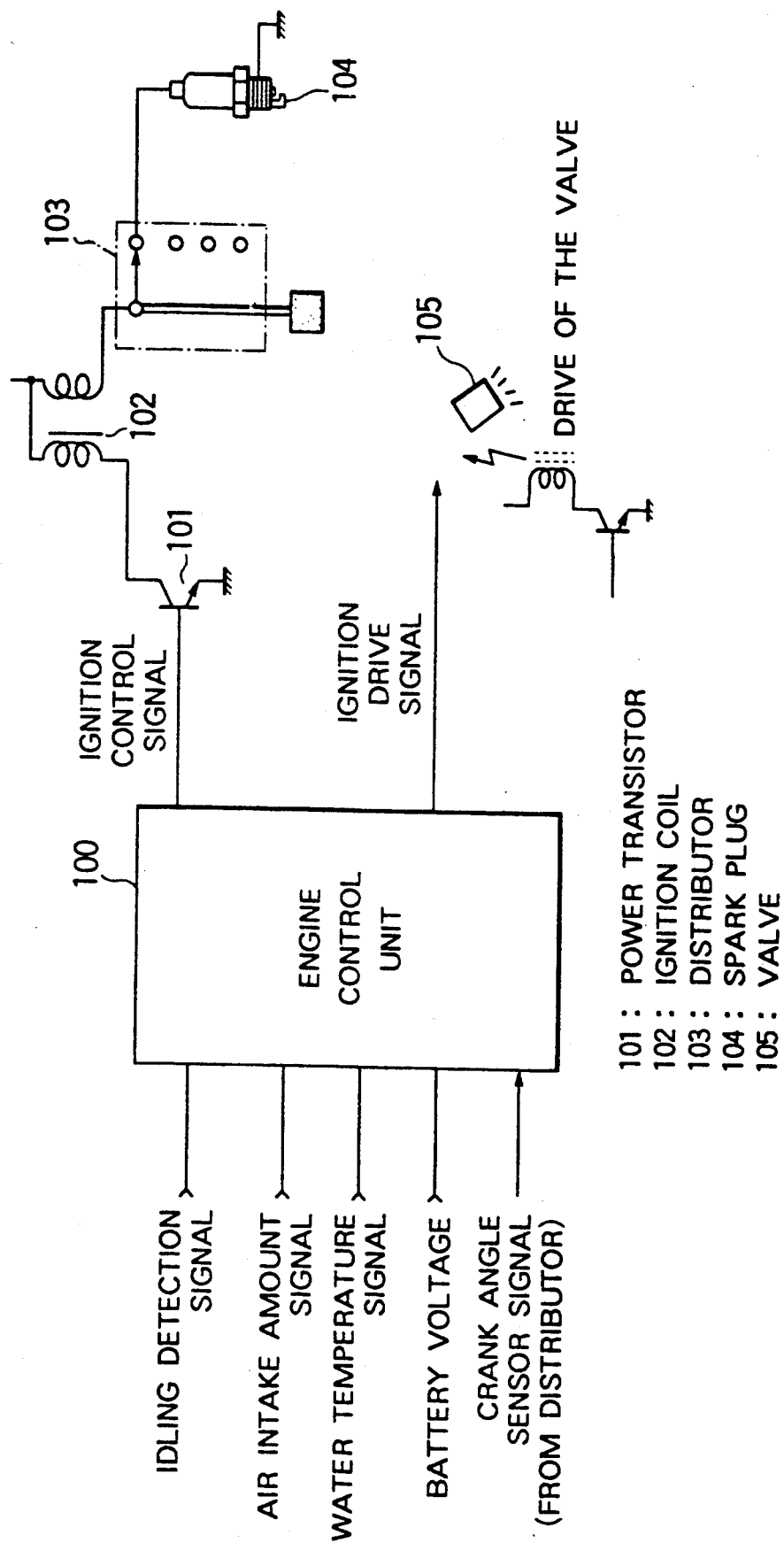
FIG. 1 is a view showing the overall organization of the conventional engine control.
Figure 2:
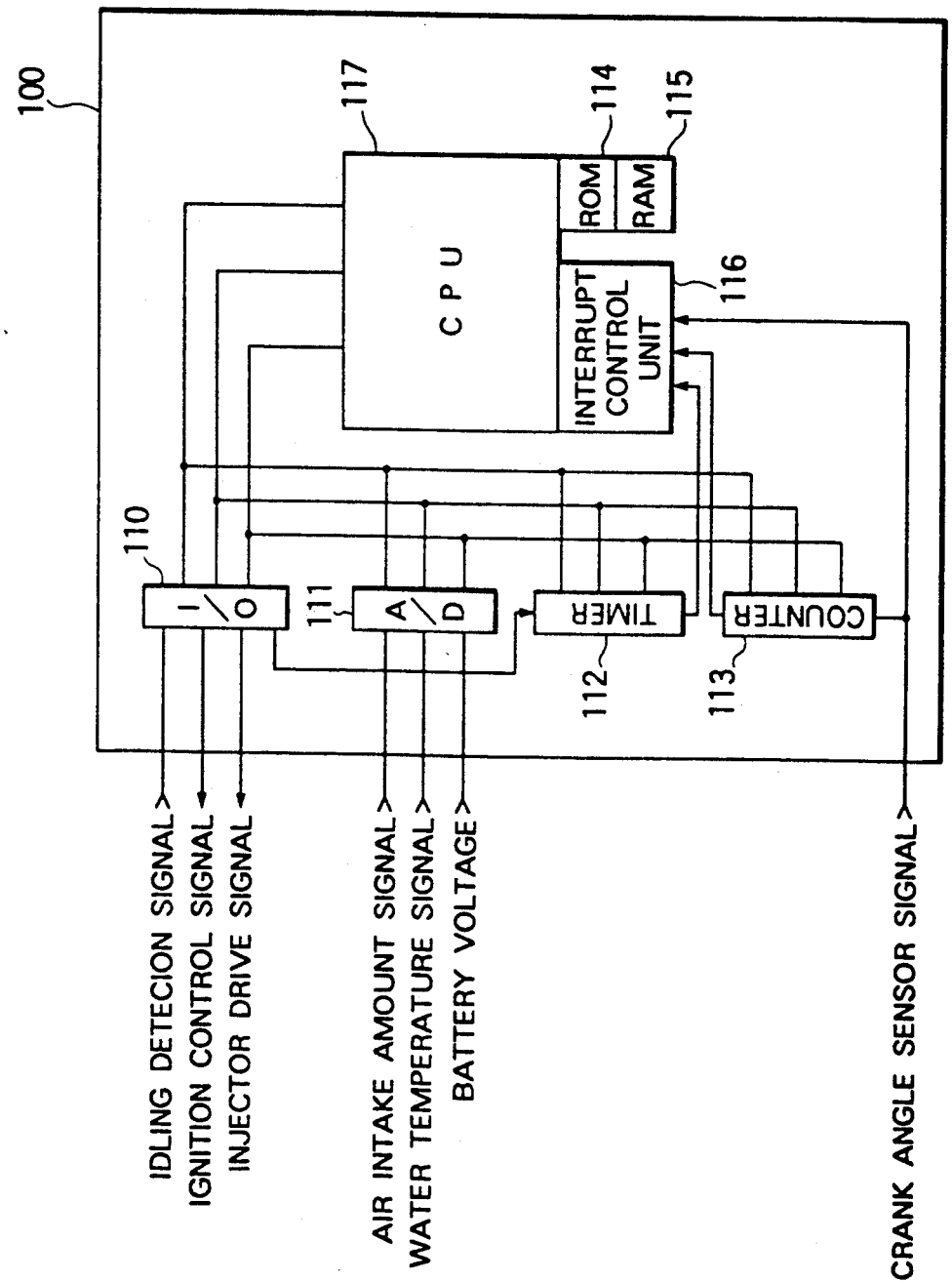
FIG. 2 is a view showing the organization of the processor of the conventional control unit.
Figure 3:
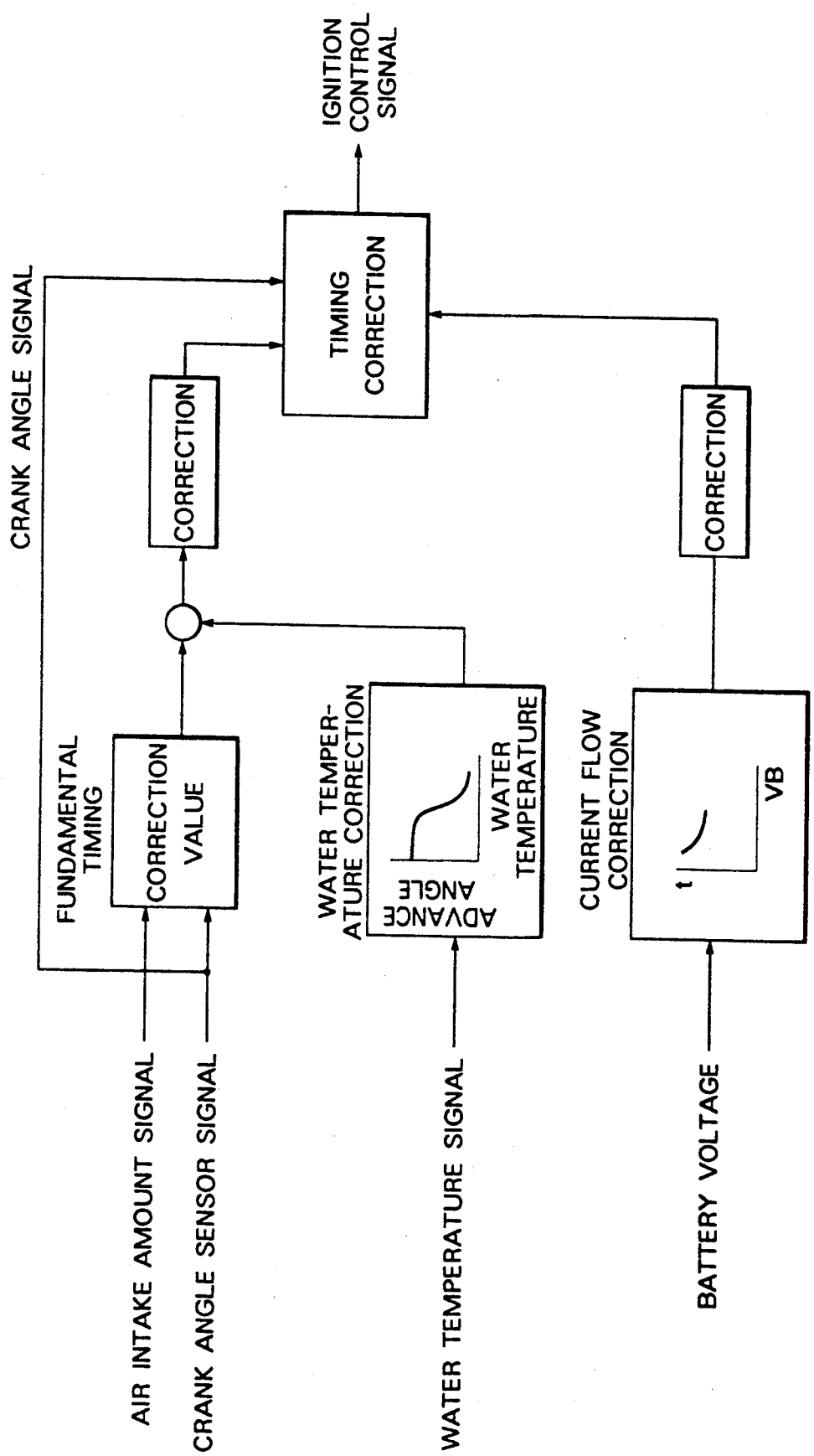
FIG. 3 is a view showing the input and output signals of the processor of FIG. 2.
Figure 6:
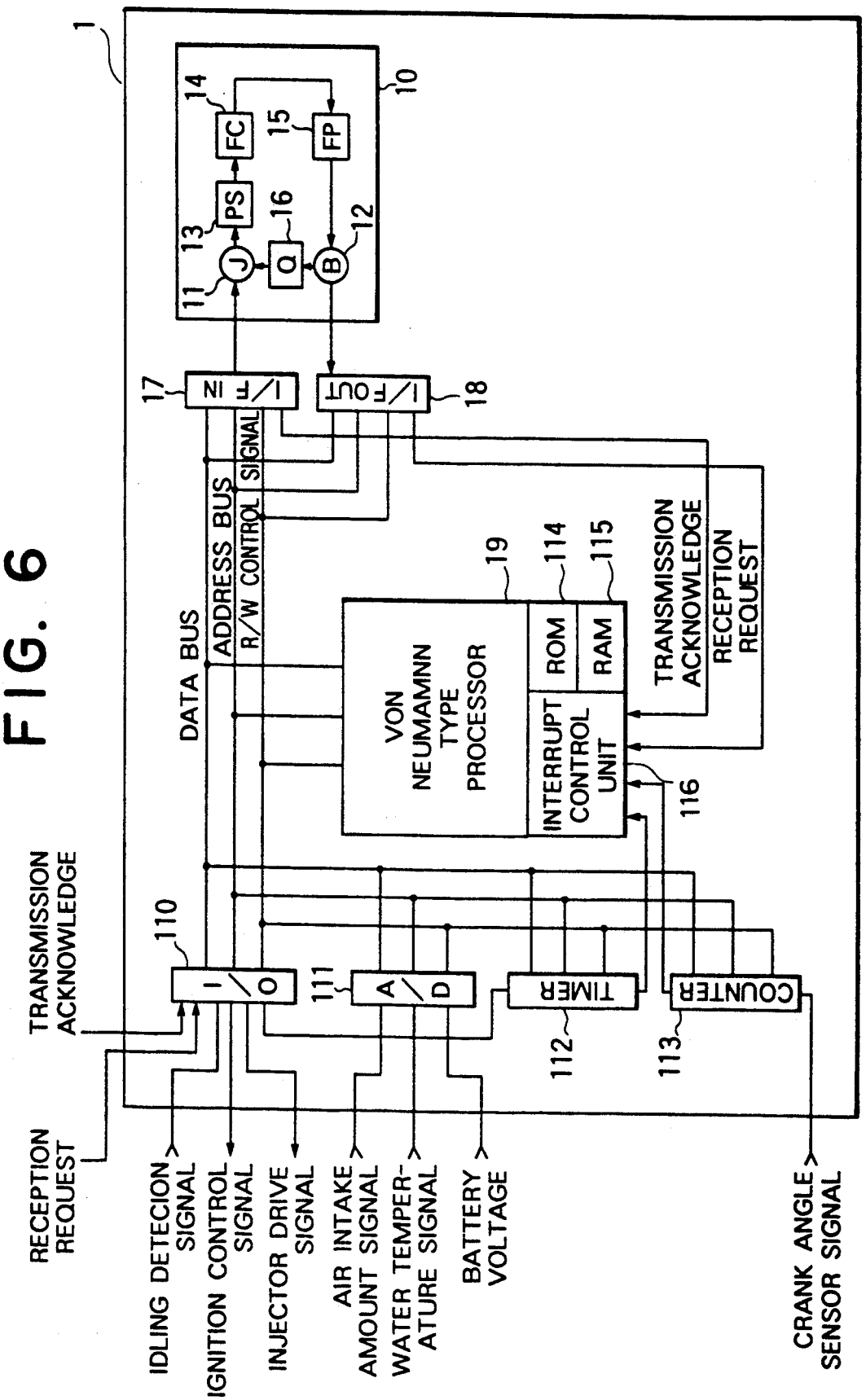
FIG. 6 is a view showing the control processor according to the first embodiment of FIG. 1.

FIG. 6 is a block diagram showing the organization of the control processor according to the first embodiment. In the figure, reference numeral 1 designates a control processor; reference numeral 10 designates a data flow (drive) type processor (DFP); reference numeral 11 designates a packet join (confluence) portion (J); reference numeral 12 designates a packet branch portion (B); reference numeral 13 designates a program store portion (PS); reference numeral 14 designates an firing processing portion (FC); reference numeral 15 designates an operation processing portion (FP); reference numeral 16 designates a queue buffer; reference numeral 17 designates an input interface (I/F$_{IN}$) of the DFP 10; reference numeral 18 designates an output interface (I/F$_{OUT}$) of DFP 10; and reference numeral 19 designates a von Neumann type processor governing the overall control of the control processor 1. The von Newman and data flow flow type processors and the input and output interfaces are integrally mounted on a single chip. Further, the reference numerals 110 through 116 designate parts substantially similar to those of FIG. 1 designated by like reference numerals.

Figure 7A:
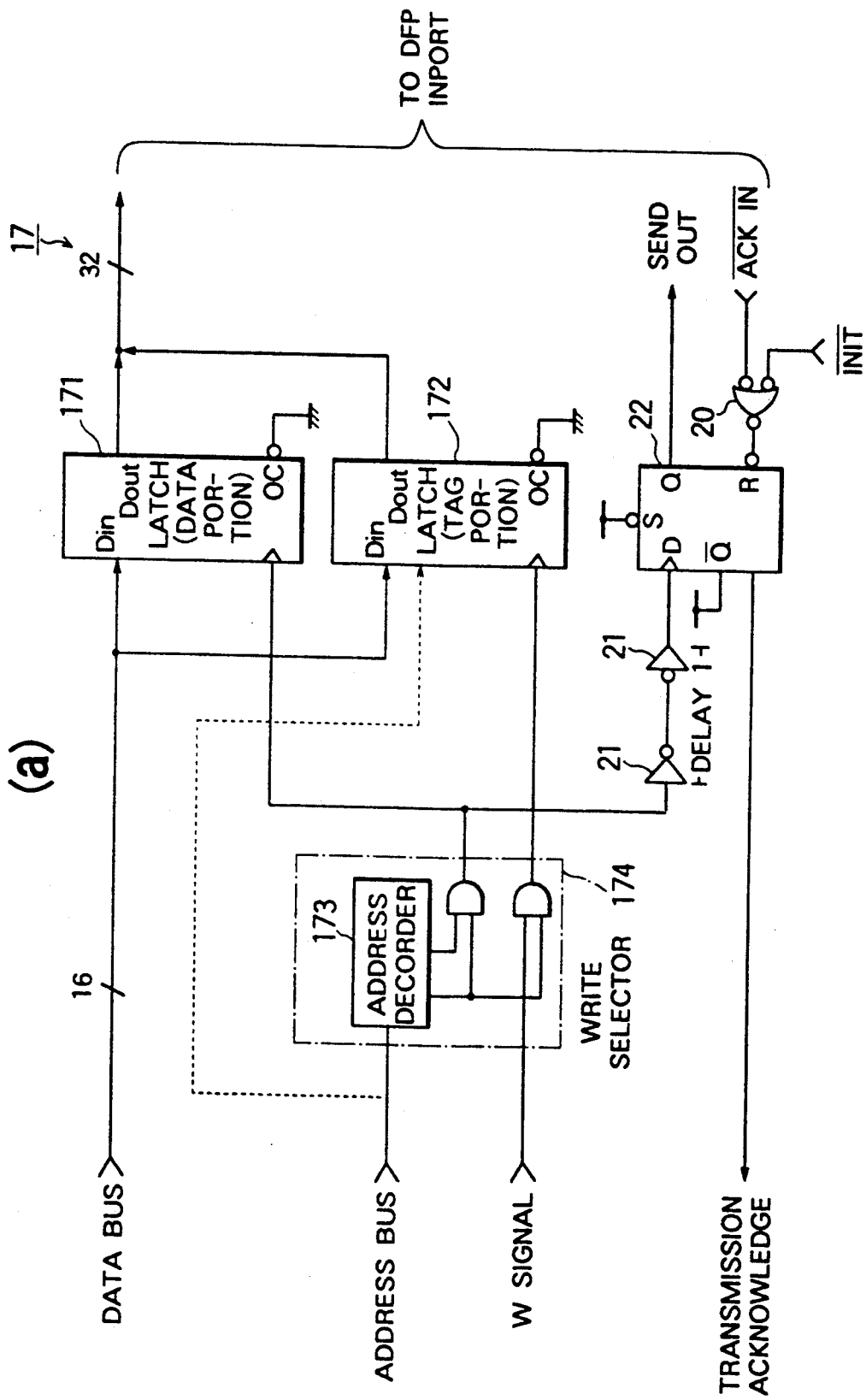
FIG. 7(a) is a view showing the input interface.
Figure 7B:
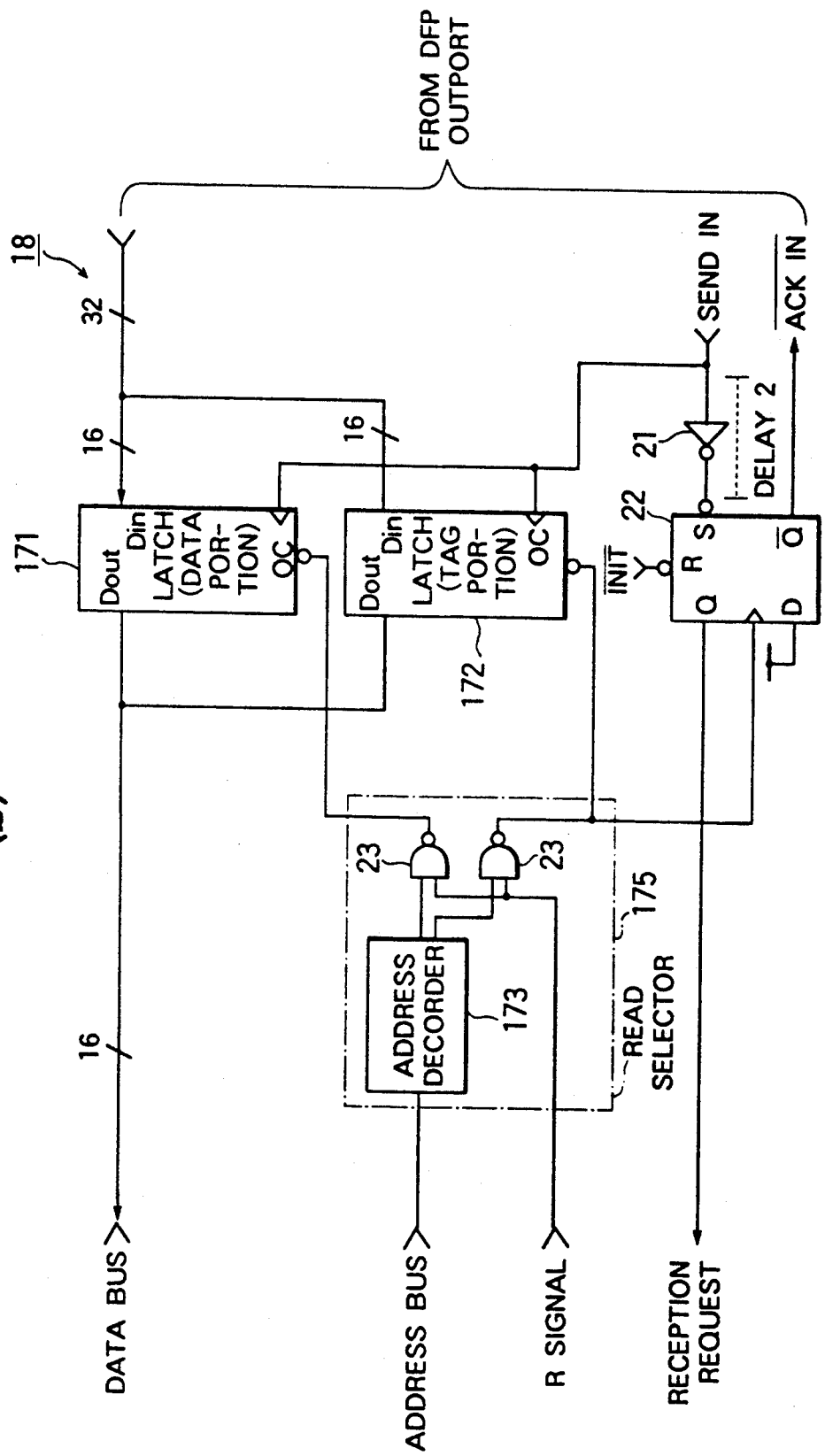
FIG. 7(b) is a view showing the output interface.
Figure 7:
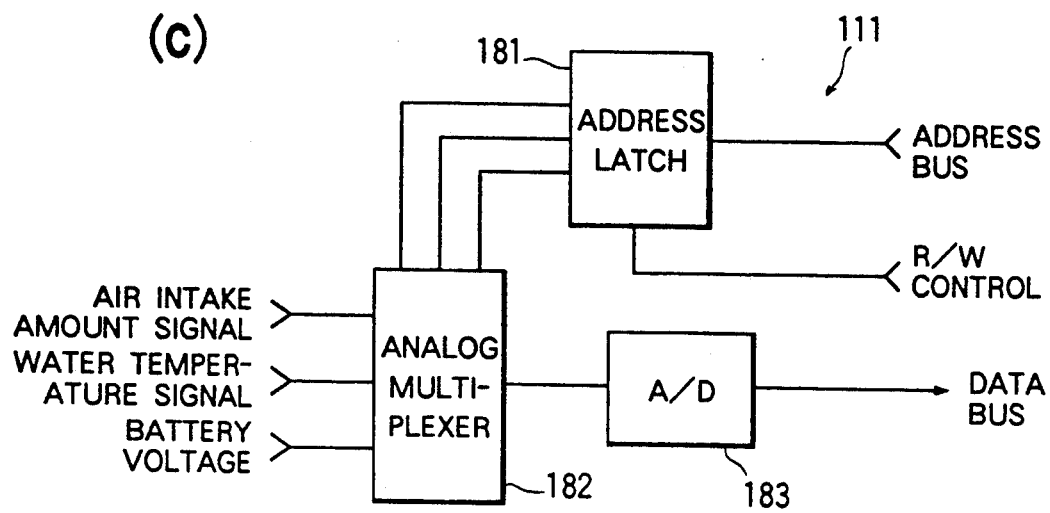
FIG. 7(c) is a view showing the A/D converter.
FIG. 7(d) is a view showing the input/output unit.
FIG. 7(e) is a view showing the timer.
Figure 7:
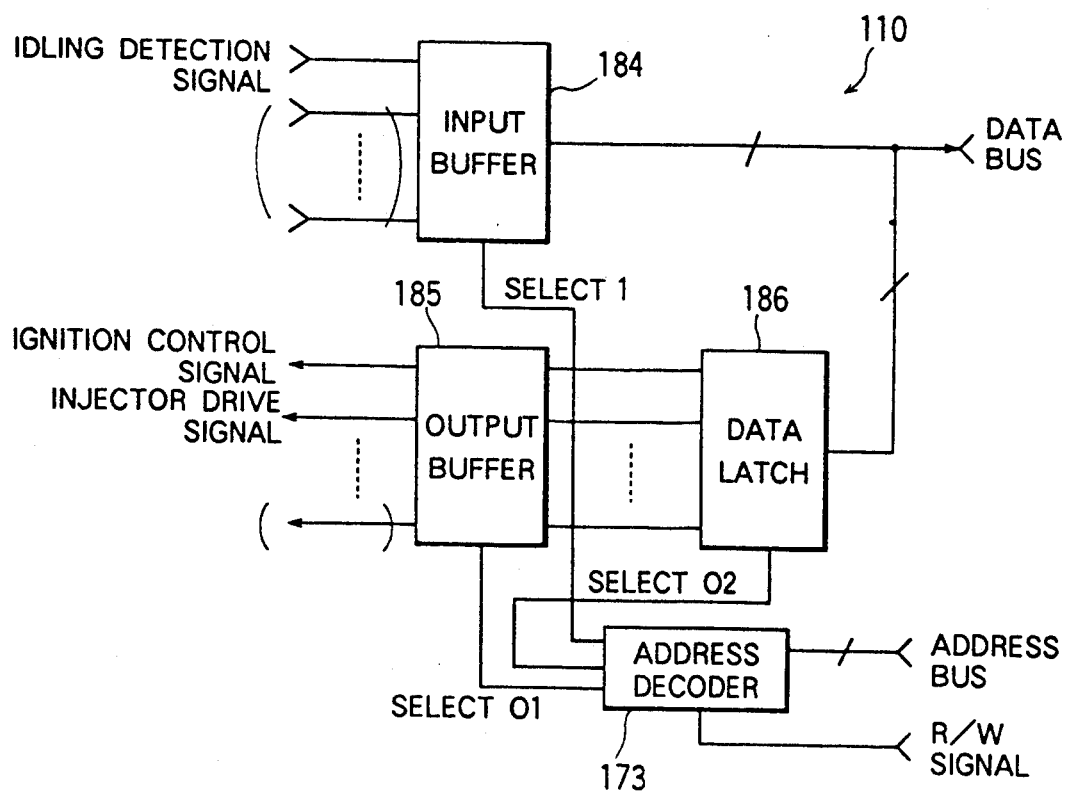
Figure 7:
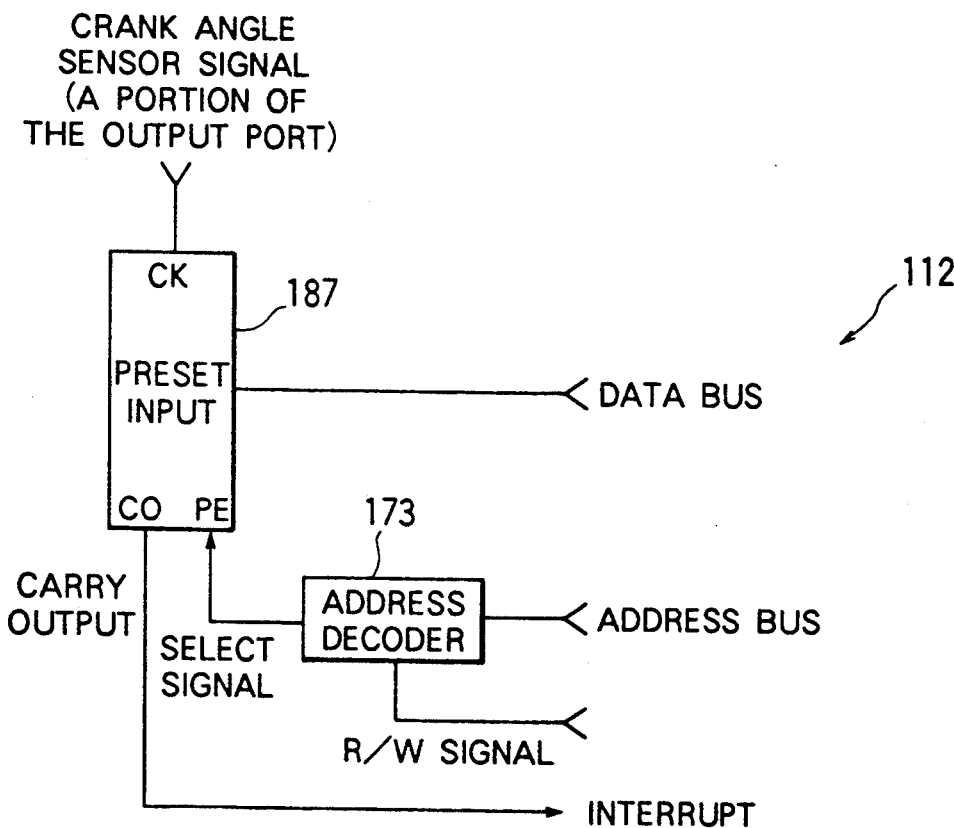

FIG. 7(a) is a view showing the input interface (I/F$_{IN}$) of the DFP 10, wherein reference numeral 171 designates a data portion latch; reference numeral 172 designates a tag portion latch; reference numeral 173 designates an address decoder; reference numeral 174 designates a write selector; reference numeral 20 designates an AND gate; reference numeral 21 designates an inverter; and reference numeral 22 designates a flip-flop having reset/set terminals. FIG. 7(b) is a view showing the output interface (I/F$_{OUT}$) of the DFP 10, wherein reference numeral 175 designates a read-out selector; and reference numeral 23 designates a NAND gate. FIG. 7(c) is a view showing the A/D convertor 111, wherein reference numeral 181 designates an address latch; reference numeral 182 designates an analog multiplexer; and reference numeral 183 designates an A/D convertor circuit. FIG. 7(d) is a view showing the input/output unit 110, wherein reference numeral 184 designates an input buffer; reference numeral 185 designates an output buffer; and reference numeral 186 designates a data latch. FIG. 7(e) is a view showing the timer 112, wherein reference numeral 187 designates a counter having a preset input.

Next, the method of operation according to this first embodiment is described.

Figure 4:
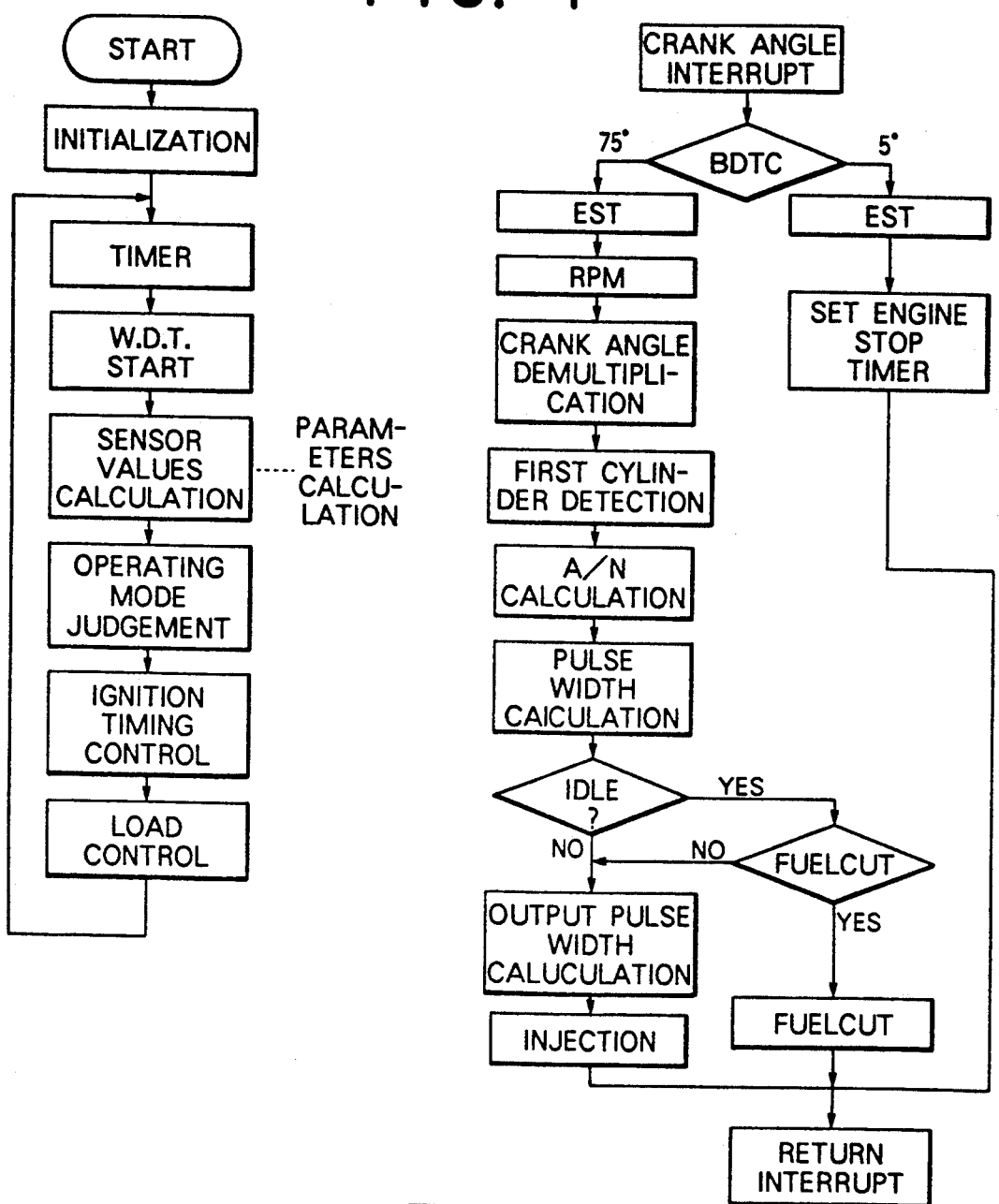
FIG. 4 is a flow chart for explaining the operation of the conventional control unit.
Figure 5:
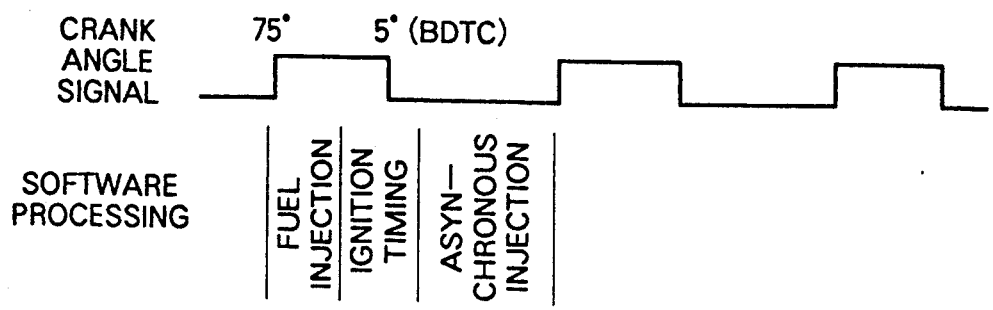
FIG. 5 is a view showing the operation of the conventional control unit.

As the input signals for the control unit 1 there are, as in the conventional case, crank angle sensor signal, air intake amount signal corresponding to the engine load, water temperature signal corresponding to engine temperature, and the battery voltage. On the other hand, as the output signals there are the ignition control signal and the injector drive signal. As the main routine job and the interrupt jobs there are those shown in FIG. 4 (a) and (b) as examples, wherein the job of FIG. 4(a) continuously effects operations and executes the process of FIG. 4(b) by taking in the necessary data from the input signals upon generation of an interrupt signal of the crank angle. At this time, the von Neumann type processor 19 receives the information from the input/output 110, A/D 111, timer 112, and the counter 113, generates a packet of operations for the DFP 10 and supplies it to the DFP 10 via the interface I/F$_{IN}$ 17. The DFP 10 transmits the result of the operations to the I/F$_{OUT}$ 18, the von Neumann type processor 19 receiving the results by means of the interrupt generated by it. The von Neumann type processor 19 outputs the results as the ignition control signal or the injector drive signal.

The data processing within the DFP is effected by means of the tag which the packet has. The von Neumann type processor 19 transmits data to the DFP 10 with a destination tag. Further, the data which the von Neumann type processor 19 receives from the DFP 10 has a tag, by means of which the von Neumann type processor 19 can distinguish what data is the data received from the DFP 10, i.e., whether it is the ignition control signal or the injector drive signal.

Next, the method of operation of the data flow type processor is described.

Figure 9:
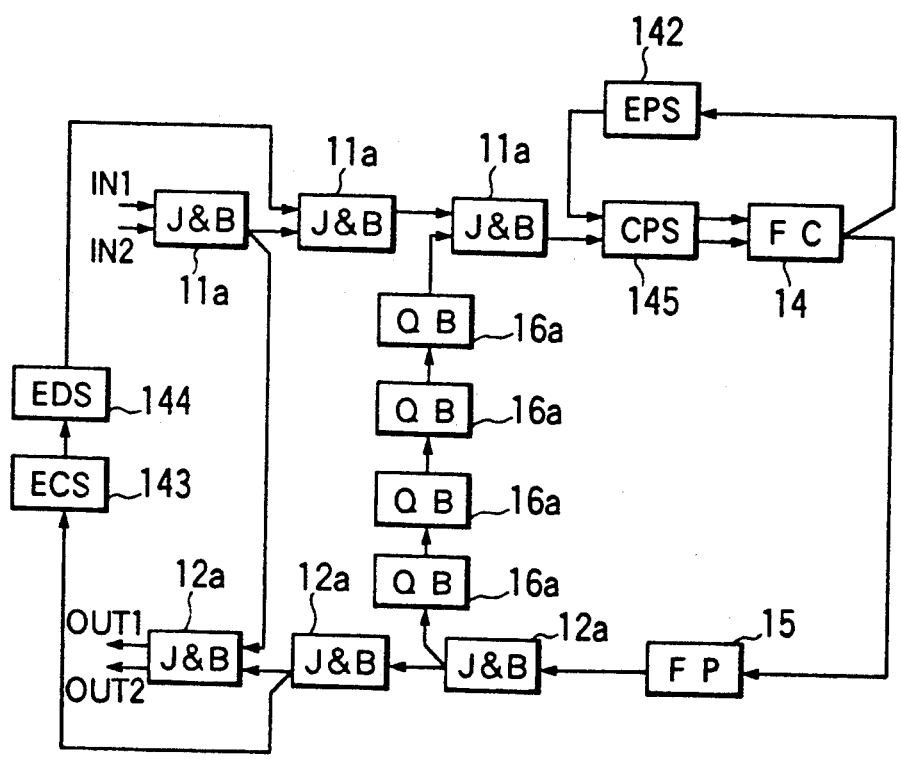
FIG. 9 is a structural view of the data flow (drive) type processor which has already been developed.

FIG. 9 is a structural view of a data flow type processor which has already been developed, and which is disclosed in Shima et al., "A Proposal for the Development Support Environment for Data Flow Type Processors", JSPP '89, pp. 281 through 288, Parallel Processing Symposium of Information Science Society. Further, FIG. 10 is a view showing the packet format having a two-word structure utilized in this data flow type processor.

In FIG. 9, reference numeral 11a designates join and branch chips (J & B) utilized as a confluence (join) function; reference numeral 12a designates join and branch chips (J & B) utilized as a branch function; reference numeral 16a designates a queue buffers (QB) having therein a queue of thirty two (32) items; reference numeral 145 designates a cache program store (CPS) storing therein a program; reference numeral 142 designates a program store (EPS) extended to the exterior; reference numeral 143 designates a color and stack control portion (ECS) disposed in the exterior; and reference numeral 144 designates a data store (EDS) extended to the exterior. Further, reference numerals 14 and 15 designate, as in FIG. 6, firing processing portion (FC) and the operation processing portion (FP).

The operation at this time is as follows.

Figure 10:
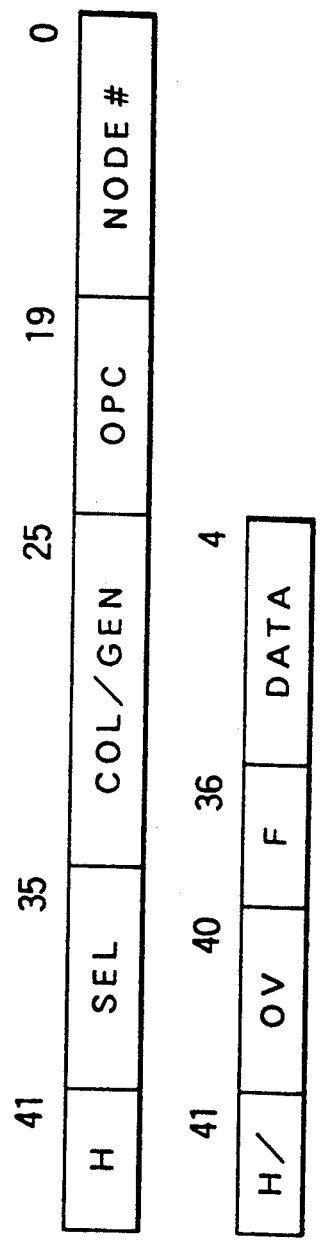
FIG. 10 is a view showing the packet format of the processor of FIG. 9.

When a packet is inputted either from input IN1 or IN2 in the packet format shown in FIG. 10, it enters into CPS 145 after passing through the three J & B's 11a. The CPS 145 has an EPS 142, and, being triggered by the next destination of the packet passing through the FC 14, the program which next becomes necessary is extracted from EPS 142, and is stored in the CPS 145. Within FC 14, it remains as it is if the operation is monadic, while it forms an operand pair if the operation is dyadic, and is outputted from the FC 14 thereafter. This operation packet is transmitted to FP 15, undergoes operation by means of an operation code (OPC), is subjected to judgment whether or not it is outputted by means of the branch function of J & B 12a, and, when it is not outputted, is returned again to CPS 145 to repeat the similar process subsequently. In the case of this organization, especially between the CPS 145 and the FC 14, as represented by two lines, there does not exist a bottleneck in the data transmission path even when a copy is executed in the CPS 141.

Figure 11:
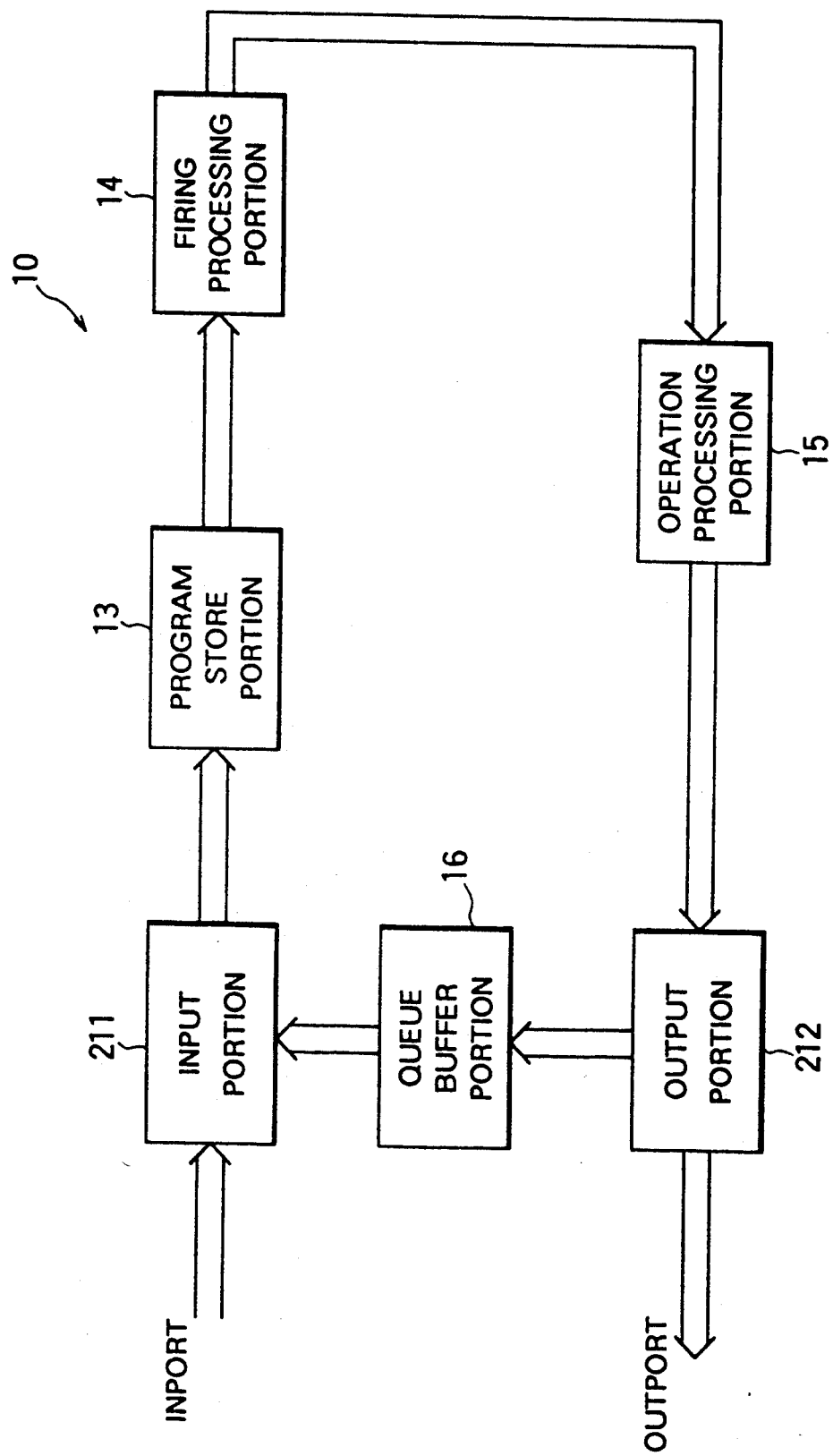
FIG. 11 is a view showing the organization of the data flow (drive) type processor of the embodiment of FIG. 6.
Figure 12:
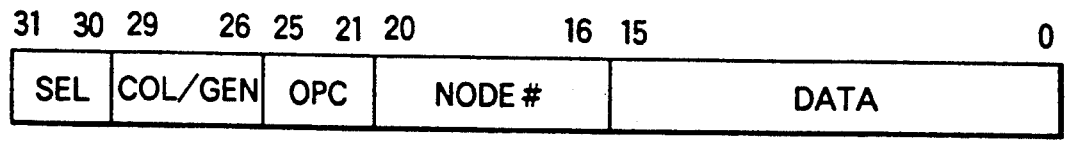
FIG. 12 is a view showing the packet format of the data flow (drive) type processor of the embodiment of FIG. 11.

FIG. 11 is a block diagram showing the organization of the data flow type processor 10 shown in the first embodiment of FIG. 6. The packet under this circumstance has a structure as shown in FIG. 12. In FIG. 11, reference numeral 211 designates an input portion, and reference numeral 212 designates an output portion, which are realized by means of the functions similar to those of J & B's 11a and J & B's 12a of FIG. 9.

In the case of this data flow type processor DFP 10, input and output are One each, wherein exterior data store EDS 144, etc., are not shown. The packet format is formed by the oneword structure shown in FIG. 12. However, the mode of operation is similar to that of FIG. 9.

The peripheral function portions in the present first embodiment are described.

As shown in FIG. 7(a), the von Neumann type processor 19 transmits a packet to the DFP 10 via the I/$F_{IN}$ 17. At this time, the von Neumann type processor 19 has the function that it first sets a destination node number in the tag portion latch 172 and then transmits the data to the data portion latch 171, thereby transmitting the data packet into the DFP 10 The handshake with respect to the data transmission is effected by means of "send out" and "Ack in" between the DFP 10 and the I/$F_{IN}$ 17, while it is effected by means of an interrupt of the transmission acknowledge signal with respect to the von Neumann type processor 19.

As shown in FIG. 7(b), the packet which is sent out from the OUT port of DFP 10 via the I/$F_{OUT}$ 18 after being processed in the DFP 10, is received by the von Neumann type processor 19. The handshake at this time is effected by means of "send in" and "Ack out" between the I/$F_{OUT}$ 18 and the von Neumann type processor 19, and by means of reception request signal in the case of the transmission between the I/$F_{OUT}$ and the von Neumann type processor 19. This reception request signal activates the interrupt control portion 116, such that the tag portion latch 172 and the data portion latch 171 are read out by the von Neumann type processor 19. In the case of the example of FIG. 7(b), the transmission and reception of the next new packet becomes possible when the data in the tag portion latch 172 is read out. The processing packet which is received by the von Neumann type processor 19 from the DFP 10 is identified from the node number within the tag as to whether it is the ignition control signal output or the injector drive signal.

As shown in FIG. 7(c), with respect to the air intake amount signal, the water temperature signal, and the battery voltage, one is selected from the analog multiplexer 182 by means of the address information in the address latch 181, and, after being converted into a digital value by the A/D convertor 183, is read out by the von Neumann type processor 19.

Further, as shown in FIG. 7(d), the inputs such as the idling detection signal are read in via the input buffer 184, while the outputs such as the ignition control signal and the injector drive signal are once stored in the data latch 186 and are outputted via the output buffer 185. These functions are equivalent to those realized by utilizing Intel 8255 peripheral I/O controllers.

Further, as shown in FIG. 7(e), a timer is constituted by utilizing a counter 187, which is provided with a circuit which generates interrupts at ignition timings with the crank angle sensor signal as its input.

Next, the second embodiment of this invention is described.

Figure 8:
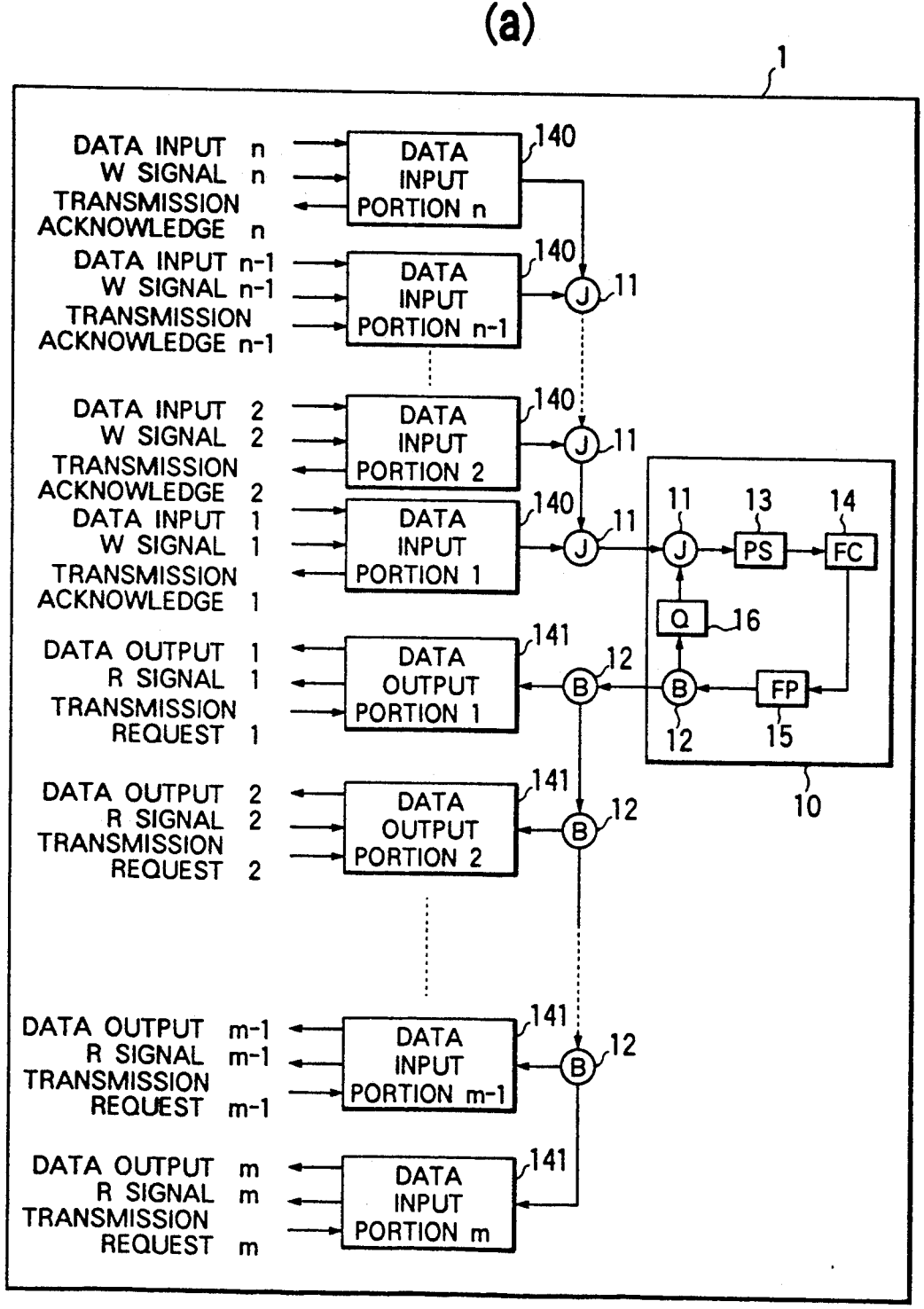
FIGS. 8(a) and (b) are views showing the control processor according to the second embodiment of this invention.
FIG. 8(c) is a view showing the data input unit thereof.
FIG. 8(d) is a view showing the data output unit thereof.
Figure 8:
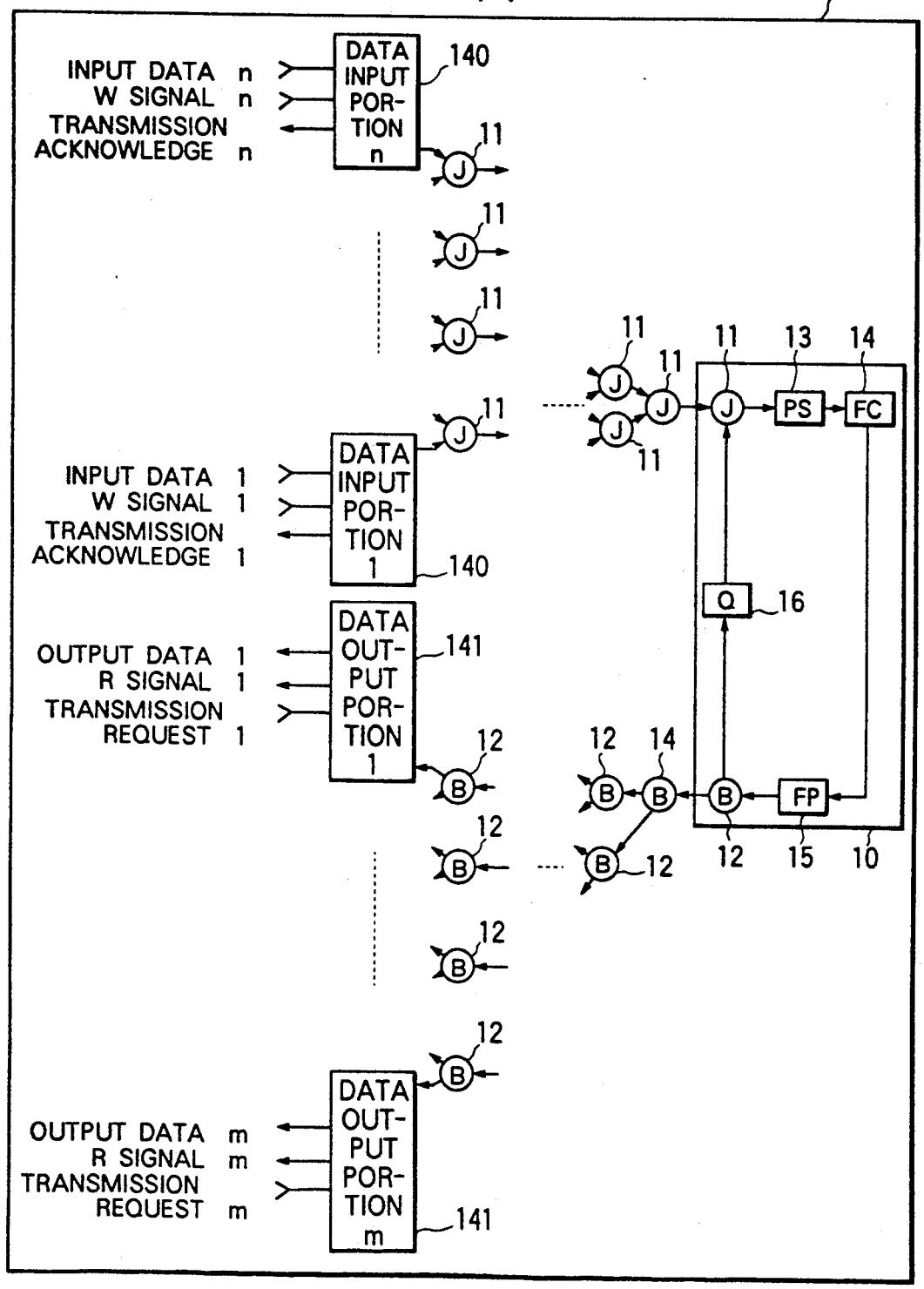
Figure 8:
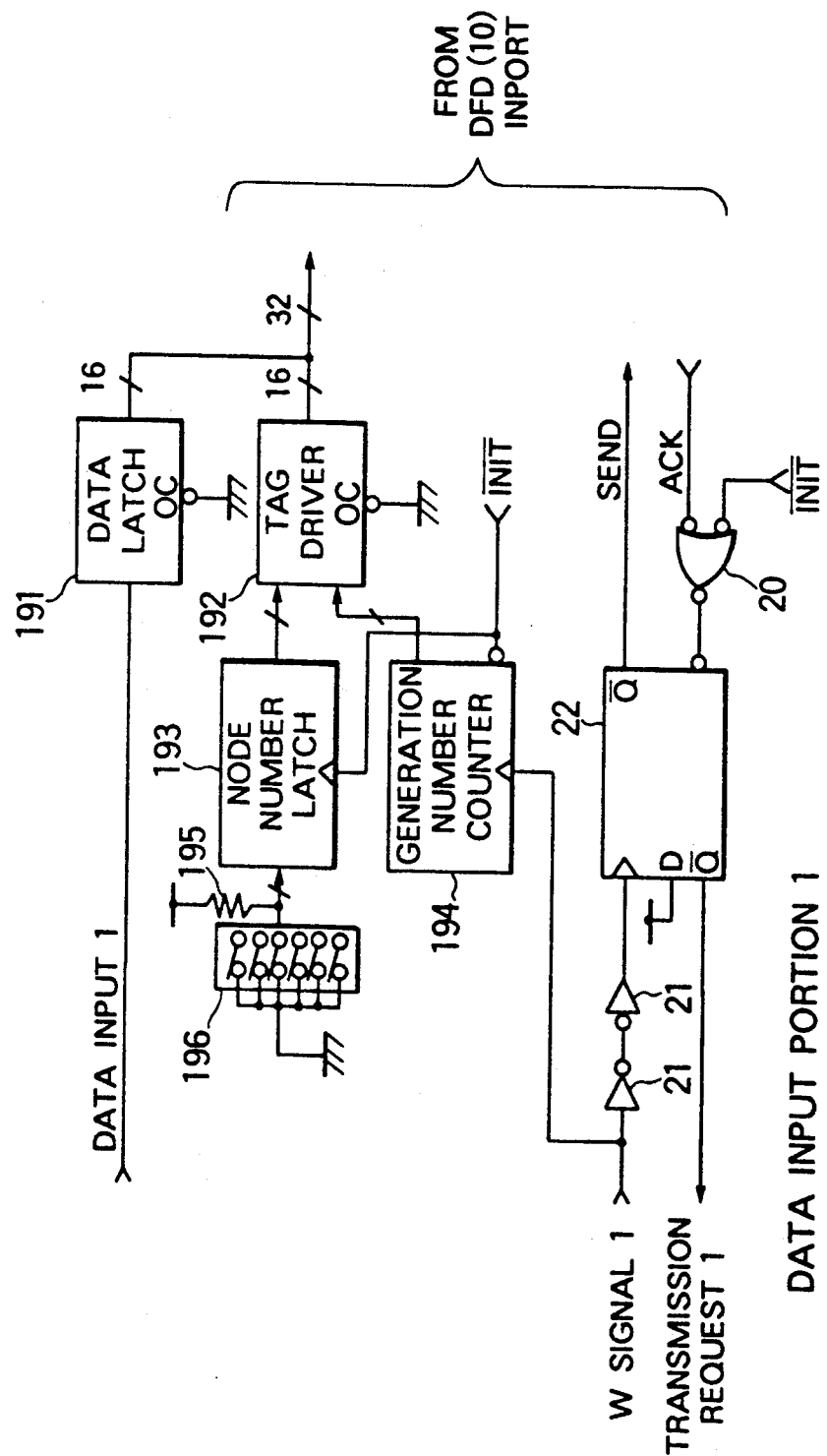

FIG. 8 (a) and (b) are views showing the organization of the control processor of the second embodiment. In the figures, reference numeral 140 designates data input portions, and reference numeral 141 designates data output portions. Further, FIG. 8 (c) and (d) are views showing the organization of a data input portion 140 and a data output portion 141 in FIG. 8 (a) and (b). In the figures, reference numeral 191 designates a data latch, reference numeral 192 designates a tag driver, reference numeral 193 designates a node number latch, reference numeral 194 designates a generation number counter, reference numeral 195 designates a pull-up resistance, reference numeral 196 designates a DIP switch, reference numeral 197 designates a data latch, reference numeral 198 designates a generation latch, reference numeral 199 designates a node number latch, and reference numeral 200 designates an automatic read-out circuit.

The processor of FIG. 8(a) relates to the case where the respective overall numbers of the data input portions and the data output portions are made, wherein the propagation takes longer time as the suffixes of the respective portions become greater, passing through more number of J's 11 or B's 12. In FIG. 8(b), the wiring is such that the propagation times are equal to each other with respect to all the data input portions 140 and data output portions 141. With respect to the data input portion of FIG. 8(c), the node number of the tag portion can be determined manually by means of the pull-up resistance 195 and the DIP switch 196, and the generation number counter 194 is incremented each time the W signal, namely the data, is inputted. The data input portion operates by transmitting the W signal when data is inputted during the time the transmission acknowledge signal shows acknowledgement.

Further, the data output portion of FIG. 8(d) latches the packet from the DFP 10, dividing it into data, generation, and node number, and transmits the reception request. Upon receiving this reception request signal, data or the generation/node number constituting the tag are received by means of the R signal. The automatic read-out circuit 200 consists of inverters 21, and has such an organization that it automatically reads out data upon reception request, returning "Ack out" to DFP 10. When a usage of the automatic read-out circuit 200 is not necessary, it can be dispensed with.

In the case of the control processor according to the second embodiment, the von Neumann type processor 19 is not utilized at all. If the input and the output signals are coupled to the data inputs 140 and the data outputs 141, respectively, the processor comes to have functions similar to the control processor including the von Neumann type processor 19 of FIG. 6, and the method of operation becomes similar.

Figure 13:
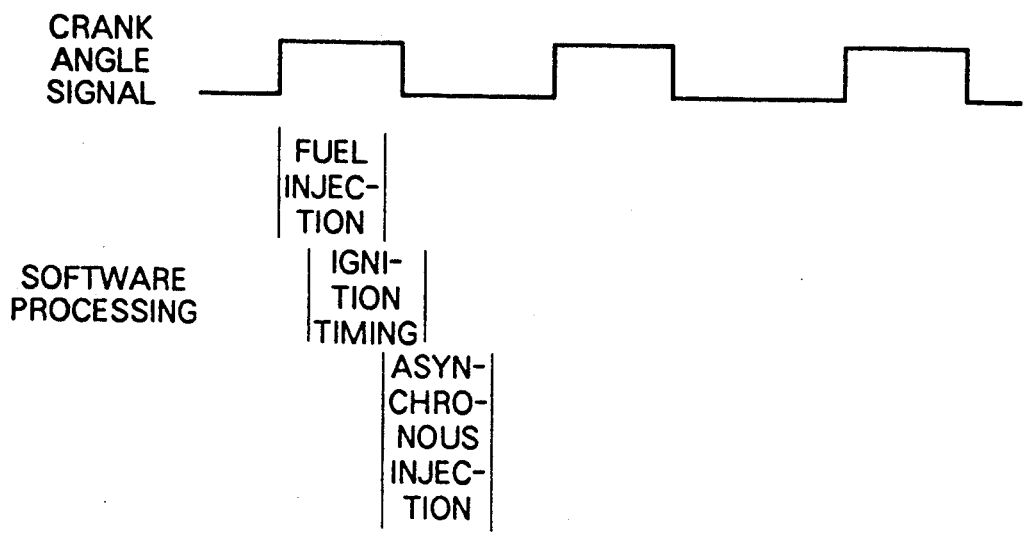
FIG. 13 is a view showing the operation of the present invention.

As described above, according to the first and the second embodiments, the processor for engine control is organized by adopting a data flow type processor DFP 10 therewithin. Thus, the respective data processing within the processor relative to the fuel injection, ignition timing, and the asynchronous injection can be effected in parallel with respect to those which can be executed in parallel, so that, while the processing time in the case where the engine control is effected by the conventional processor is represented, as shown in FIG. 12, in the pattern by which it is terminated at the time point at which the fuel injection, ignition timing, and the asynchronous injection are sequentially added, according to this invention it is improved as shown in FIG. 13, and the processing termination time can greatly be reduced. This increases the freedom of the control software preparation, augments the operation processing amount, and makes possible the application thereof to the multi-cylinder and high rpm engine. Due to the improvement of the engine control performance, the riding comfort including the drivability of the automobile is greatly improved.

By the way, in the above embodiments, description has been made of control processors utilized in the engine control. However, by utilizing the organization of this invention for the controls such as motor control, robot control, audio control, image control, etc., the freedom of software preparation can be enhanced and the operation processing amount can be increased, just as in the above embodiments, such that the controllability can greatly be enhanced.

INDUSTRIAL APPLICABILITY

The control processor according to this invention realizes, when applied to automotive engine control, for example, a multi-cylinder high rpm engine of high performance, thereby realizing a high performance passenger automobile with a good riding comfort. Further, it can be applied to various control fields such as motor control, robot control, audio control, and image control.

We claim:

1. A control processor characterized in that it is provided with a data flow type processor comprising:
a program storage portion that receives a packet containing a destination node number as a tag and data, said storage portion reading out information from the destination node number that includes a next destination node number, an operation code, and a selection code corresponding to designated hardware, said program storage portion substituting and attaching them as a new tag;
a firing detection portion for judging, based on a next destination of the packet received from said program storage portion and information indicating a first or a second term of dyadic operands, whether or not the packet is to be fired, wherein said firing detection portion stores said packet when it is not fired and transmits said dyadic terms together with the tag;
an operation processing portion which, by means of an operation code and the two operands contained in an output of said firing detection portion and supplied to said operation processing portion, executes the operations;
a portion which performs branching and joining of the packet received from said operation processing portion; and
a queue buffer for queuing the packet when the packet is returned to an input of said program storage portion;
wherein said control processor further comprises:
a von Neumann type processor which governs control including that of said data flow type processor;
an input/output portion for receiving and outputting data to and from an exterior; wherein said input data is calculated from the output data;
an input interface for forming an input packet from an input signal supplied to said input interface from said von Neumann type processor and inputting the input packet into said data flow type processor, wherein said input interface comprises:
tag setting means for receiving said input signal and for setting a destination node number in a tag portion of said input packet;
means for generating a send out signal and for supplying said send out signal to said data flow type processor; and
means for generating a transmission acknowledge signal upon receipt of an acknowledge in signal from said data flow type processor and for supplying said transmission acknowledge signal to said von Neumann type processor; and
an output interface for transmitting the output of said data flow type processor to the von Neumann type processor, wherein said output interface comprises:
latching means for latching data and tag information of a packet received from said data flow type processor;
means for generating an acknowledge out signal and for supplying said acknowledge out signal to said data flow type processor upon receipt of a data in signal supplied from said data flow type processor upon transmission of said packet from said data flow type processor; and
means for generating a reception request signal which is supplied to said von Neumann type processor to initiate the retrieval of said data and said tag information from said latching means.

2. A control processor characterized in that it is provided with a data flow type processor comprising:
a program store portion that receives a packet which contains a destination node number as a tag and data, said program store portion reading out, from the destination node number contained in said packet, the next destination node number, an operation code, and a selection code corresponding to desired hardware, said program store portion substituting and attaching them as a new tag;

a firing detection portion which judges, based on the next destination of the packet transmitted from said program store portion and information indicating a first or a second term of dyadic operands, whether or not the packet is to be fired, wherein said firing detection portion stores said packet when it is not fired and transmits said dyadic terms together with the tag;

an operation processing portion which, by means of an operation code and at least one of the two operands contained in the output of said firing detection portion and supplied to said operation processing portion, executes the operations;

a branching and joining portion which performs branching and joining functions of the packet received from said operation processing portion; and a queue buffer for queuing the packet;

wherein an input/output portion for receiving the input signal for the inputs of said data flow type processor is constituted by utilizing said joining and branching portion, said processor for control is provided with an input portion for direct input control and an output portion for direct control on the basis of an operation processing result, and operations are effected by means of the data flow type processor by utilizing input data supplied from said processor for control, such that the output data are proposed to the controlled object.

3. A processor as claimed in claim 1, wherein said von Neumann processor, said data flow type processor, said input interface, said output interface, and said input/output portion are integrally mounted on a single chip to constitute a control unit.

4. A control processor characterized in that it is provided with a data flow type processor comprising:

a program storage portion that receives a packet containing a destination node number as a tag and data, said storage portion reading out information from the destination node number that includes a next destination node number, an operation code, and a selection code corresponding to designated hardware, said program storage portion substituting and attaching them as a new tag;

a firing detection portion for judging, based on a next destination of the packet received from said program storage portion and information indicating a first or a second term of dyadic operands, whether or not the packet is to be fired, wherein said firing detection portion stores said packet when it is not fired and transmits said dyadic terms together with the tag;

an operation processing portion which, by means of an operation code and the two operands contained in an output of said firing detection portion and supplied to said operation processing portion, executes the operations;

a portion which performs branching and joining of the packet received from said operation processing portion; and a queue buffer for queuing the packet when the packet is returned to an input of said program storage portion;

wherein said control processor further comprises:

a von Neumann type processor which governs control including that of said data flow type processor;

an input/output portion for receiving and outputting data to and from an exterior;

an A/D converting means for converting analog input signals supplied by a plurality of sensors into corresponding digital signals, said A/D converting means comprising:

an analog multiplexer for multiplexing said analog input signals;

means for selecting one of said analog input signals to be supplied to said von Neumann type processor; and an A/D converter for converting said one of said analog input signals to a digital signal;

timer means for generating an interrupt signal, based upon receipt of a signal from a first sensor, for interrupting the operation of said von Neumann type processor to receive data from said plurality of sensors;

an input interface for forming an input packet from a signal supplied to said input interface from said von Neumann type processor and inputting the input packet into said data flow type processor; and an output interface for transmitting the output of said data flow type processor to said von Neumann type processor.

5. A control processor provided with a data flow type processor comprising:

a program storage portion that receives a packet containing a destination node number as a tag and data, said storage portion reading out information from the destination node number that includes a next destination node number, an operation code, and a selection code corresponding to designated hardware, said program storage portion substituting and attaching them as a new tag;

a firing detection portion for judging, based on a next destination of the packet received from said program storage portion and information indicating a first or a second term of dyadic operands, whether or not the packet is to be fired, wherein said firing detection portion stores said packet when it is not fired and transmits said dyadic terms together with the tag;

an operation processing portion which, by means of an operation code and the two operands contained in an output of said firing detection portion and supplied to said operation processing portion, executes the operations;

a portion which performs branching and joining of the packet received from said operation processing portion; and a queue buffer for queuing the packet when the packet is returned to an input of said program storage portion;

wherein said control processor further comprises:

an input/output portion for receiving and outputting data to and from an exterior circuit;

a plurality of data input means for respectively receiving a plurality of sensor input signals and for generating input packets from said plurality of sensor input signals and for supplying said input packets to said data flow type processor;

a plurality of data output means for respectively receiving output packets from said data flow type processor and for outputting a transmission reception request signal upon receipt of said output packets from said data flow type processor to said input/output means to initiate a read-out operation.

6. The control processor according to claim 5, wherein said data input means comprise:
- means for generating a destination node number in a tag portion of said input packets; and
- means for generating a send out signal and for supplying said send out signal to said data flow type processor;
- means for generating a transmission acknowledge signal upon receipt of an acknowledge in signal from said data flow type processor and for supplying said transmission acknowledge signal to said input/output portion.

7. The control processor according to claim 5, wherein said data output means comprise:
- output data latching means for latching data and tag information from said output packets from said data flow type processor;
- means for generating an acknowledge out signal and for supplying said acknowledge out signal to said data flow type processor upon receipt of a send in signal from said data flow type processor when an output packet is transmitted from said data flow type processor; and
- means for generating said transmission reception request signal upon receipt of said send in signal from said data flow type processor and for supplying said transmission reception request signal to said input/output portion.

* * * * *